United States Patent
Kubota et al.

(10) Patent No.: US 6,689,843 B2
(45) Date of Patent: Feb. 10, 2004

(54) ACRYLIC RUBBER COMPOSITION, CROSSLINKABLE ACRYLIC RUBBER COMPOSITION, AND CROSSLINKED OBJECT OBTAINED THEREFROM

(75) Inventors: Isao Kubota, Kawasaki (JP); Daisuke Tsugawa, Kawasaki (JP); Koichi Nishimura, Kawasaki (JP)

(73) Assignee: Zeon Corporation, Tokyo (JP)

( * ) Notice: Subject to any disclaimer, the term of this patent is extended or adjusted under 35 U.S.C. 154(b) by 0 days.

(21) Appl. No.: 10/181,925

(22) PCT Filed: Jan. 29, 2001

(86) PCT No.: PCT/JP01/00558

§ 371 (c)(1),
(2), (4) Date: Jul. 29, 2002

(87) PCT Pub. No.: WO01/57132

PCT Pub. Date: Sep. 8, 2001

(65) Prior Publication Data

US 2003/0027935 A1 Feb. 6, 2003

(30) Foreign Application Priority Data

Jan. 28, 2000 (JP) ........................................ 2000-020839

(51) Int. Cl.$^7$ ........................ C08F 120/06; C08C 19/22
(52) U.S. Cl. ................................ 525/329.7; 525/329.9; 525/330.3; 525/330.5; 525/370; 525/374

(58) Field of Search .................... 525/329.7, 329.9, 525/330.3, 330.5, 370, 374

(56) References Cited

U.S. PATENT DOCUMENTS 3,976,627 A * 8/1976 Morris .................... 525/329.9

FOREIGN PATENT DOCUMENTS

| JP | 56-135539 | 10/1981 |
| JP | 7-053830  | 2/1995  |
| JP | 52-098048 | 8/1997  |
| JP | 11-021411 | 1/1999  |
| JP | 11-140264 | 5/1999  |

* cited by examiner

Primary Examiner—Robert Deshon Harlan
(74) Attorney, Agent, or Firm—Armstrong, Kratz, Quintos, Hanson & Brooks, LLP

(57) ABSTRACT

An acrylic rubber composition comprising 100 parts by weight of (a) an acrylic rubber having carboxyl groups, 0.3 to 8 parts by weight of (b) an aromatic secondary amine compound, and 0.3 to 8 parts by weight of (c) nickel dialkyldithiocarbamate. A crosslinkable acrylic rubber composition further comprising 0.1 to 10 parts by weight of a crosslinking agent in addition the ingredients (a), (b) and (c). By crosslinking the crosslinkable acrylic rubber composition, a crosslinked article having high heat resistance and exhibiting especially a reduced variation in elongation by heat load can be obtained.

18 Claims, No Drawings

ACRYLIC RUBBER COMPOSITION, CROSSLINKABLE ACRYLIC RUBBER COMPOSITION, AND CROSSLINKED OBJECT OBTAINED THEREFROM

TECHNICAL FIELD

This invention relates to an acrylic rubber composition that is a material for giving a crosslinked article having excellent heat resistance; a crosslinkable acrylic rubber composition; and a crosslinked article made by crosslinking the crosslinkable acrylic rubber composition. More specifically, it relates to in acrylic rubber composition and a crosslinkable acrylic rubber composition that is a material for giving a crosslinked article exhibiting a reduced variation in elongation upon the imposition of heat load; and a crosslinked article made by crosslinking these rubber compositions.

BACKGROUND ART

Acrylic rubbers have good heat resistance, and therefore, are widely used in an automobile field and related fields.

However, there has been an increasing demand for producing an acrylic rubber having more enhanced heat resistance. To meet this demand, an attempt of increasing the amount of an antioxidant incorporated in the rubber was proposed in the early stage. This proposal invited a problem such that, when a large amount of an antioxidant was incorporated, bloom occurred on crosslinked articles. Thus, it was impossible to enhance the heat resistance to a desired level by increasing the amount of an antioxidant.

As another attempt, it was proposed to incorporate a specific kind of an antioxidant. For example, an acrylic rubber composition having nickel dialkyldithiocarbamate incorporated therein as an antioxidant has been proposed in Japanese Unexamined Patent Publication No. S56-135539. The acrylic rubber composition in this publication caused bloom only to a negligible extent after it was crosslinked, even in the case when the amount of nickel dialkyldithiocarbamate was increased, but, the heat resistance of a crosslinked object could not be enhanced to a sufficiently high level. Especially the obtained crosslinked article tends to exhibit a large variation in elongation upon the imposition of heat load.

As still another attempt, it was proposed to two kinds of aromatic secondary amine antioxidants in an acrylic rubber to enhance the heat resistance (Japanese Unexamined Patent Publication No. H11-21411). However, the heat resistance of resulting crosslinked articles still could not be enhanced to a desired high level in some fields and especially, the crosslinked articles exhibited undesirably large variation in elongation depending upon the heat load applied. If the amount of the two kinds of secondary amine antioxidants is increased to enhance the heat resistance more, bloom is liable to occur.

DISCLOSURE OF THE INVENTION

A primary object of the present invention is to provide an crosslinked acrylic rubber article having excellent heat resistance and especially exhibiting a reduced variation in elongation upon the imposition of heat load, as compared with the conventional acrylic rubber articles.

The present inventors have found that an acrylic rubber composition comprising an acrylic rubber containing units of an ethylenically unsaturated monomer having a carboxyl group, an aromatic secondary amine compound and nickel dialkyldithiocarbamate gives a crosslinked article having excellent heat resistance and exhibiting a reduced variation especially in elongation upon the imposition of heat load. The present invention has been completed on the basis of this finding.

Thus, in accordance with the present invention, there are provided:

an acrylic rubber composition comprising 100 parts by weight of (a) an acrylic rubber having carboxyl groups, 0.3 to 8 parts by weight of (b) an aromatic secondary amine compound, and 0.3 to 8 parts by weight of (c) nickel dialkyldithiocarbamate.

a crosslinkable acrylic rubber composition comprising 100 parts by weight of (a) an acrylic rubber having carboxyl groups, 0.3 to 8 parts by weight of (b) an aromatic secondary amine compound, 0.3 to 8 parts by weight of (c) nickel dialkyldithiocarbamate, and 0.1 to 10 parts by weight of a crosslinking agent; and a crosslinked article made by crosslinking the crosslinkable acrylic rubber composition.

BEST MODE FOR CARRYING OUT THE INVENTION

The acrylic rubber composition of the present invention comprises 100 parts by weight of (a) an acrylic rubber having carboxyl groups, 0.3 to 8 parts by weight of (b) an aromatic secondary amine compound, and 0.3 to 8 parts by weight of (c) nickel dialkyldithiocarbamate.

The acrylic rubber (a) having carboxyl groups used in the present invention (which acrylic rubber (a) is hereinafter called "acrylic rubber (a)" for brevity when appropriate) contains a carboxyl group preferably in an amount of $5 \times 10^{-4}$ to $4 \times 10^{-1}$ ephr, more preferably $2.5 \times 10^{-3}$ to $2 \times 10^{-1}$ ephr, and especially preferably $5 \times 10^{-3}$ to $1 \times 10^{-1}$ ephr. If the content of carboxyl groups in the acrylic rubber (a) having carboxyl groups is too small, the acrylic rubber composition cannot be crosslinked to a desirably sufficient extent and a crosslinked article made therefrom sometimes becomes difficult to retain its shape. In contrast, if the content of carboxyl groups is too large, a crosslinked article made therefrom sometimes becomes rigid and loses its rubber elasticity.

The acrylic rubber (a) may be a copolymer made by copolymerization of an acrylic acid ester monomer as the principal constituent with an ethylenically unsaturated monomer having a carboxyl group or carboxyl groups, and an optional other copolymerizable monomer. Alternatively, the acrylic rubber (a) may be a modified copolymer made by modifying a conventional acrylic rubber prepared by copolymerization, to introduce carboxyl groups therein. The acrylic rubber (a) will be more specifically described by the copolymer made by copolymerization of an acrylic acid ester monomer with an ethylenically unsaturated monomer having a carboxyl group or carboxyl groups.

As the acrylic acid ester monomer, an acrylic acid alkyl ester monomer, the alkyl group of which has 1 to 8 carbon atoms, can be used alone, or, preferably in combination with acrylic acid alkoxyalkyl ester, the alkoxyalkyl group of which has 2 to 16 carbon atoms.

As specific examples of the acrylic acid alkyl ester monomer having an alkyl group of 1 to 8 carbon atoms, there can be mentioned methyl acrylate, ethyl acrylate, n-propyl acrylate, n-butyl acrylate, isopropyl acrylate, isobutyl acrylate, n-hexyl acrylate, 2-ethylhexyl acrylate and cyclohexyl acrylate. Of these, acrylic acid alkyl ester monomers having an alkyl group of 2 to 4 carbon atoms are preferable. Ethyl acrylate and n-butyl acrylate are especially preferable.

As the acrylic acid alkoxyalkyl ester monomer having an alkoxyalkyl group of 2 to 16 carbon atoms, acrylic acid alkoxyalkyl ester monomers having an alkoxyalkyl group of 2 to 8 carbon atoms are preferable. As specific examples of the preferable acrylic acid alkoxyalkyl ester monomers having an alkoxyalkyl group of 2 to 8 carbon atoms, there can be mentioned methoxymethyl acrylate, ethoxymethyl acrylate, 2-ethoxyethyl acrylate, 2-butoxyethyl acrylate, 2-methoxyethyl acrylate, 2-propoxyethyl acrylate, 3-methoxypropyl and 4-methoxybutyl acrylate. Of these, 2-ethoxyethyl acrylate and 2-methoxyethyl acrylate are especially preferable.

The ethylenically unsaturated monomer having a carboxyl group or carboxyl groups is a monomer having an ethylenically unsaturated bond and containing a carboxyl group or carboxyl groups, or a carboxylic anhydride group.

As specific examples of the ethylenically unsaturated monomer having a carboxyl group or carboxyl groups, there can be mentioned carboxylic acid monomers such as acrylic acid, methacrylic acid, ethacrylic acid, itaconic acid, maleic acid, fumaric acid and citraconic acid; butenedioic acid monoalkyl ester monomers such as monomethyl maleate, monoethyl maleate, mono-n-butyl maleate, monomethyl fumarate, monoethyl fumarate and mono-n-butyl fumarate; and carboxylic acid anhydride monomers such as maleic anhydride and citraconic anhydride. Of these, butenedioic acid monoalkyl ester monomers are preferable. Monoethyl maleate, mono-n-butyl maleate, monoethyl fumarate and mono-n-butyl fumarate are especially preferable.

The acrylic rubber (a) may contain, in addition to units of the above-mentioned monomers, units of a monomer copolymerizable with the above-mentioned monomers. As specific examples of the copolymerizable monomer, there can be mentioned ethylene, propylene, acrylonitrile, methacrylonitrile, styrene, α-methylstyrene, vinyl chloride, vinylidene chloride, vinyl acetate, ethyl vinyl ether, butyl vinyl ether, divinylbenzene, furfuryl acrylate, acrylamide, ethylene glycol diacrylate, propylene glycol diacrylate, alkoxyalkyl methacrylates, methacrylamide, ethylene glycol dimethacrylate, propylene glycol dimethacrylate, isoprene, butadiene, chloroprene, piperylene, dicyclopentadiene, norbornene, ethylidenenorbornene, hexadiene and norbornadiene.

The total amount of units of the acrylic acid ester monomer as the principal constituent and units of the ethylenically unsaturated monomer having a carboxyl group or carboxyl groups in the acrylic rubber (a) having carboxyl groups is preferably at least 70% by weight, more preferably at least 80% by weight and especially preferably at least 90% by weight, based on the weight of the copolymer. If the total amount of the acrylic acid ester monomer units and the carboxyl group-containing ethylenically unsaturated monomer units is too small, namely, the amount of units of the monomer copolymerizable therewith is too large, the acryl rubber (a) tends to become poor in rubber characteristics such as rubber elasticity.

In the acrylic rubber (a), the amount of the acrylic acid ester monomer units is preferably in the range of 90 to 99.5% by weight, more preferably 95 to 99% by weight, based on the total amount of the acrylic acid ester monomer units and the units of the ethylenically unsaturated monomer having a carboxyl group or carboxyl groups or a carboxylic anhydride group. If the relative amount of the acrylic acid ester monomer units is too large, namely, the relative amount of the carboxyl group-containing ethylenically unsaturated monomer units is too small, a crosslinkable rubber composition tends to become poor in crosslinkability. In contrast, if the relative amount of the acrylic acid ester monomer units is too small, namely, the relative amount of the carboxyl group-containing ethylenically unsaturated monomer units is too large, a crosslinked article obtained from a crosslinkable rubber composition tends to have poor tensile strength and elongation.

The acrylic rubber (a) has a Mooney viscosity ($ML_{1+4}$, 100° C.) preferably in the range of 10 to 70, more preferably 20 to 60 and especially preferably 30 to 50. If the Mooney viscosity is too small, the shapability and processability of a crosslinkable rubber composition and the mechanical strength of a crosslinked article are liable to be poor. In contrast, if the Mooney viscosity is too small, the shapability and processability of a crosslinkable rubber composition are liable to be poor.

The aromatic secondary amine compound (b) used in the present invention is a secondary amine having an aromatic ring or rings, and includes, for example, diarylamines, diaryl-p-phenylenediamines, alkyl-aryl-p-pneylenediamines, di(arylamine)alkylenes and dialkyl-p-phenylenediamines. As the aromatic secondary amine compound (b), those which have a structure such that two groups each having an aromatic ring are bonded to a nitrogen atom or nitrogen atoms are preferable. Of these, diarylamines, diaryl-p-phenylenediamines and di(arylamine)alkylenes are preferable. The two groups each having an aromatic ring may be the same as or different from each other.

As specific examples of the diarylamine, there can be mentioned phenyl-α-naphthylamine, 4,4'-dioctyldiphenylamine, 4,4'-bis(α,α-dimethylbenzyl)diphenylamine, p-(p-toluenesulfonylamide)diphenylamine, p-isopropoxy-diphenylamine, bis(phenylisopropylidene)-4,4-diphenylamine, 4-(α-phenylethyl)diphenylamine and 4,4'-bis(α-phenylethyl)-diphenylamine. As specific examples of the diaryl-p-phenylenediamine, there can be mentioned N,N'-diphenyl-p-phenylenediamine, N,N'-di-2-naphthyl-p-phenylenediamine and N,N'-bis(1,4-dimethylpentyl)-p-phenylenediamine. As specific examples of the di(arylamine)alkylene, there can be mentioned N,N'-diphenylethylenediamine and N,N'-diphenyl-propylenediamine. As specific examples of the alkyl-aryl-p-phenylenediamine, there can be mentioned N-isopropyl-N'-phenyl-p-phenylenediamine, N-cyclohexyl-N'-phenyl-p-phenylenediamine and N-phenyl-N'-(3-methacryloyloxy-2-hydroxypropyl)-p-phenylenediamine and N,N'-bis(1-methylheptyl)-p-phenylenediamine.

Of these, phenyl-α-naphthylamine, 4,4'-dioctyl-diphenylamine, 4,4'-bis(α,α-dimethylbenzyl)diphenylamine, 4-(α-phenylethyl)diphenylamine, 4,4'-bis(α-phenylethyl)-diphenylamine, N,N'-diphenyl-p-phenylenediamine, N-isopropyl-N'-phenyl-p-phenylenediamine and N-phenyl-N'-(3-methacryloyloxy-2-hydroxypropyl)-p-phenylenediamine are preferable.

The amount of the aromatic secondary amine compound (b) is in the range of 0.3 to 8 parts by weight, preferably 0.4 to 5 parts by weight and especially preferably 0.5 to 3, based on 100 parts by weight of the acrylic rubber (a). If the amount of the aromatic secondary amine compound (b) is too small, a crosslinked article tends to have a poor heat resistance. In contrast, if the amount of the aromatic secondary amine compound (b) is too large, the aromatic secondary amine compound (b) is liable to bleed on the surface of a crosslinked article.

The nickel dialkyldithiocarbamate (c) used in the present invention is a compound represented by the following general formula:

wherein $R^1$ and $R^2$ represents an alkyl group. The two alkyl groups may be either the same as or different from each other. The alkyl group maybe a cycloalkyl group. Each of the alkyl groups preferably has 1 to 8 carbon atoms, and, as specific examples of the alkyl group, there can be mentioned methyl, ethyl, butyl, hexyl, octyl, 2-ethylhexyl, cyclohexyl and cyclooctyl groups. As specific examples of the preferable nickel dialkyldithiocarbamate, there can be mentioned nickel dimethyldithiocarbamate, nickel diethyldithiocarbamate and nickel dibutyldithiocarbamate. Nickel diethyldithiocarbamate and nickel dibutyldithiocarbamate are especially preferable.

The amount of the nickel dialkyldithiocarbamate (c) is in the range of 0.3 to 8 parts by weight, preferably 0.4 to 5 parts by weight and especially preferably 0.5 to 3 parts by weight, based on 100 parts by weight of the acrylic rubber (a). If the amount of the nickel dialkyldithiocarbamate (c) is too small, the physical properties of a crosslinked article are liable to greatly vary depending upon the heat load imposed thereto. In contrast, if the amount of the nickel dialkyldithiocarbamate (c) is too large, the nickel dialkyldithiocarbamate tends to bleed on the surface of a crosslinked article.

The crosslinkable acrylic rubber composition of the present invention comprises a crosslinking agent in addition to the ingredients in the above-mentioned acrylic rubber composition.

The crosslinking agent used is not particularly limited provided that it is capable of crosslinking the acrylic rubber (a), and, as specific examples thereof, there can be mentioned aliphatic diamine compounds such as hexamethylenediamine, hexamethylenediamine carbamate and N,N'-dicinnamylidene-1,6-hexanediamine; aromatic diamine compounds such as 4,4'-methylenedianiline, m-phenylenediamine, 4,4'-diaminodiphenyl ether, 3,4'-diaminodiphenyl ether, 4,4'-(m-phenylene-diisopropylidene)dianiline, 4,4'-(p-phenylene-diisopropylidene)dianiline, 2,2'-bis[4-(4-aminophenoxy)phenyl]propane, 4,4'-diaminobenzanilide and 4,4'-bis(4-amoinophenoxy)biphenyl; polyfunctional isocyanate compounds such as hexamethylene diisocyanate, dimethyldiphenylene diisocyanate, isophoron diisocyanate, trimethylhexamethylene dilsocyanate, blocked diisocyanate and dicyclhexylmethane diisocyanate; and hydrazide group-containing compounds such as isophthalic acid dihydrazide, terephthalic acid dihydrazide and phthalic acid dihydrazide. Of these, polyamine compounds such as aliphatic diamine compounds and aromatic diamine compounds are preferable.

The amount of the crosslinking agent is in the range of 0.1 to 10 parts by weight, preferably 0.2 to 7 parts by weight and especially preferably 0.3 to 5 parts by weight, based on 100 parts by weight of the acrylic rubber (a). If the amount of the crosslinking agent is too small, a crosslinked article has a greatly low mechanical strength and exhibits large variation in elongation and tensile strength depending upon the heat load imposed. In contrast, if the amount of the crosslinking agent is too large, a crosslinked article tends to have undesirably large hardness and low elongation and exhibit too small variation depending upon the heat load.

In the present invention, if desired, a crosslinking accelerator can be used in combination with the crosslinking agent. The amount of the crosslinking accelerator is preferably in the range of 0.1 to 20 parts by weight, more preferably 0.2 to 15 parts by weight and especially preferably 0.3 to 10 parts by weight, based on 100 parts by weight of the acrylic rubber (a). If the amount of the crosslinking accelerator is too small, a substantial crosslinking acceleration effect is sometimes not manifested, and a crosslinked article is liable to have an extremely low mechanical strength and exhibit undesirably large variation in elongation and tensile strength depending upon the heat load imposed. In contrast, if the amount of the crosslinking accelerator is too large, the crosslinking rate becomes too high upon crosslinking, the crosslinking accelerator tends to bloom on the surface of a crosslinked article, and the crosslinked article is liable to become too hard.

The crosslinking accelerator used is not particularly limited provided that its is capable of accelerating a crosslinking reaction when it is used in combination with the crosslinking agent. As preferable crosslinking accelerators used in combination with a polyamine compound, i.e., a preferable crosslinking agent, there can be mentioned bases and conjugated bases, which have a base dissociation constant in the range of $10^{-12}$ to $10^{+6}$ in water at 25° C. and are substantially incapable of reacting with a crosslinking monomer units to cause crosslinking. As examples of the preferable crosslinking accelerator, there can be mentioned guanidine accelerators, quaternary onium salt accelerators, tertiary amine accelerators, tertiary phosphine accelerators, alkali metal salts of a weak acid, alkali metal alkoxylates and alkali metal phenolates. The guanidine accelerators include, for example, 1,3-diphenyl-guanidine and di-o-tolylguanidine. The quaternary onium salt accelerators include, for example, tetrabutylammonium bromide and tetrabutylammonium chloride. The tertiary amine accelerators include, for example, hexamethyltriethylene-tetramine and 1,8-diaza-bicyclo[5,4,0]undecene-7. The tertiary phosphine accelerators include, for example, triphenylphosphine and tri(methylphenyl)phosphine. The alkali metal salts of a weak acid include, for example, sodium, potassium and lithium salts of inorganic weak acids such as phosphoric acid, carbonic acid and hydrogencarbonic acid, and organic weak acids such as stearic acid and lauric acid. The alkali metal alkoxylates include, for example, sodium methoxide, sodium isopropoxide and potassium isopropoxide. The alkali metal phenolates include, sodium phenolate, potassium phenolate and potassium benzoate. These crosslinking accelerators can also be used as a combination of at least two thereof.

The crosslinkable rubber composition of the present invention can be prepared by mixing together the above-mentioned ingredients by an appropriate mixing means such as roll mixing, Banbury mixing, screw mixing or solution mixing.

If desired, additives can be incorporated in the acrylic rubber composition and crosslinkable acrylic rubber composition of the present invention, respecitively, provided that the intended characteristics of the compositions can be obtained. The additives include, for example, reinforcers, fillers, antioxidants and antioxidants other than those mentioned above, light stabilizers, scorch retarders, crosslinking retarders, plasticizers, processing aids, lubricants, stickners, self-adhesives, fire-retarders, mildewproofing agents, antistaic agents and colorants.

The acrylic rubber composition and crosslinkable acrylic rubber composition of the present invention can be prepared, respectively, by mixing together the above-mentioned ingredients by an appropriate mixing means such as roll mixing, Banbury mixing, screw mixing or solution mixing.

No limitation is imposed to the methods of shaping and crosslinking the crosslinkable rubber composition of the present invention, but the crosslinkable rubber composition can be suitable for extrusion shaping. The shaping and crosslinking can be carried out concurrently, or, separately in this order, which can be determined depending upon the particular shaping method, the particular crosslinking method, and the particular shape of a crosslinked article to be produced.

The crosslinkable rubber composition of the present invention can be crosslinked by heating. The heating temperature for crosslinking is preferably in the range of 130 to 220° C., more preferably 140 to 210° C. When the heating temperature is too low, a substantial long crosslinking time is required or the crosslinking density is reduced. In contrast, when the heating temperature is too high, crosslinking rapidly occurs and shaping failure is sometimes caused.

The crosslinking time varies depending upon the crosslinking method, the crosslinking temperature and the shape of a crosslinked article to be produced, but is preferably in the range of 30 seconds to 5 hours in view of the crosslinking density and the production efficiency.

The heating means conventionally adopted for crosslinking rubber can appropriately be used, which includes, for example, press heating, steam heating, oven heating and hot air heating.

The invention will now be specifically described by the following examples and comparative examples.

EXAMPLES 1–2

Comparative Examples 1–4

As acrylic rubber (a), acrylic rubber comprising 58% by weight of ethyl acrylate units, 40% by weight of butyl acrylate units and 2% by weight of monobutyl fumarate units, and having a Mooney viscosity ($ML_{1+4}$, 100° C.) of 35 (hereinafter abbreviated to "acrylic rubber A") was used. 100 parts by weight of acrylic rubber A, 60 parts by weight of MAF carbon black ("Seast 116" available from Tokai Carbon K.K.), 2 parts by weight of stearic acid, and the ingredients shown in Table 1 were kneaded together by using a Banbury mixer at 50° C., and then the mixture was kneaded together with 0.45 part by weight of 4,4'-diaminodiphenyl ether as a crosslinking agent, and 2 parts by weight of di-o-tolylguanidine ("Nocceler DT" available from Ohuchi Shinko Kagaku Kogyo K.K.) as a crosslinking accelerator by using an open roll to prepare a crosslinkable rubber composition.

This crosslinkable rubber composition was press-molded at 170° C. for 20 minutes whereby molding and crosslinking were carried out concurrently to prepare a test sample having a size of 15 cm×15 cm×2 mm. The molded test sample was subjected to secondary crosslinking at 170° C. for 4 hours. The tensile strength, elongation, hardness and permanent set of the crosslinked article were evaluated according to JIS K6301. The results are shown in Table 1.

The test sample was further left to stand at 175° C. for 500 hours, and the tensile strength, elongation, hardness and permanent set of the crosslinked article were evaluated according to JIS K6301. The results are shown in Table 1.

comparative examples 5–7

As acrylic rubber (a), acrylic rubber comprising 48.2% by weight of ethyl acrylate units, 30.0% by weight of butyl acrylate units, 20.0% by weight of 2-methoxyethyl acrylate units and 1.8% by weight of vinyl chloroacetate units, and having a Mooney viscosity ($ML_{1+4}$, 100° C.) of 40 (hereinafter abbreviated to "acrylic rubber B") was used. Acrylic rubber A and the ingredients shown in Table 2 were kneaded together by using a Banbury mixer at 50° C., and then the mixture was kneaded together with 0.5 part by weight of 2,4,6-trimercapto-s-triazine ("ZISNE-F" available from Sankyo Kasei Kogyo K.K.) as a crosslinking agent, and 1.5 parts by weight of zinc dibutyldithiocarbamate ("Nocceler BZ" available from Ohuchi Shinko Kagaku Kogyo K.K.) as a crosslinking accelerator by using an open roll to prepare a crosslinkable rubber composition.

This crosslinkable rubber composition was molded and crosslinked, and further subjected to secondary crosslinking by the same procedures as described in Examples 1 and 2 to prepare a crosslinked article. The physical properties of the crosslinked article were evaluated, and further the crosslinked article was further left to stand at 175° C. for 500 hours, and the physical properties of the crosslinked article were evaluated, by the same procedures as described in Examples 1 and 2. The results are shown in Table 2.

TABLE 1

|  | Example | | Comparative Example | | | |
|---|---|---|---|---|---|---|
|  | 1 | 2 | 1 | 2 | 3 | 4 |
| Composition of crosslinkable rubber composition (wt. parts) | | | | | | |
| (a) Acrylic rubber A | 100 | 100 | 100 | 100 | 100 | 100 |
| (b) N-phenyl-N'-isopropyl-p-phenylenediamine | — | 2 | — | — | 1 | — |
| 4,4'-bis (α, α-dimethyl-benzyl) diphenylamine | 2 | — | — | 3 | 2 | — |
| (c) Nickel dibutyldithio-carbamate | 1 | 2 | 2 | — | — | 2 |
| Poly (2,2,4-trimethyl-1,2-dihydroquinone | — | — | — | — | — | 1 |
| Dry physical properties: | | | | | | |
| Tensile strength (MPa) | 13.1 | 13.0 | 13.3 | 13.2 | 13.3 | 13.3 |
| Elongation (%) | 220 | 220 | 240 | 240 | 260 | 250 |
| Hardness | 69 | 70 | 70 | 68 | 68 | 68 |
| Physical properties after imposition of heat load | | | | | | |
| Tensile strength (MPa) | 7.1 | 7.8 | 8.4 | 6.6 | 7.5 | 8.5 |
| Elongation (%) | 180 | 150 | 140 | 150 | 140 | 120 |
| Hardness | 87 | 89 | 91 | 87 | 92 | 92 |
| Variation of physical properties after imposition of heat load | | | | | | |
| Tensile strength variation (%) | −46 | −40 | −37 | −50 | −44 | −36 |
| Elongation variation (%) | −18 | −32 | −42 | −38 | −46 | −52 |
| Hardness variation | +18 | +19 | +21 | +19 | +24 | +24 |

In comparative Example 1 wherein an acrylic rubber composition not containing an aromatic secondary amine (b) was used, variation in physical properties, for example, variation in elongation by heat load was too large. In comparative Example 2 wherein an acrylic rubber composition not containing nickel dialkyldithiocarbamate (c) was used, variation in physical properties, for example, variation in elongation by heat load was too large. In comparative Example 3 wherein an acrylic rubber composition containing only two kinds of aromatic secondary amines (b), but not containing nickel dialkyldithiocarbamate (c) was used, variation in physical properties, for example, variation in elongation and hardness by heat load was too large. In comparative Example 4 wherein an acrylic rubber composition containing an amine-ketone antioxidant instead of aromatic secondary amine (b) was used, variation in physical properties, for example, variation in elongation and hardness by heat load was too large.

TABLE 2

|  | Example | | Comp. Example | | |
|---|---|---|---|---|---|
|  | 1 | 2 | 5 | 6 | 7 |
| Composition of crosslinkable rubber composition (wt. parts) | | | | | |
| (a) Acrylic rubber A | 100 | 100 | — | — | — |
| Acrylic rubber B | — | — | 100 | 100 | 100 |
| (b) N-phenyl-N'-isopropyl-p-phenylenediamine | — | 2 | — | — | — |
| 4,4'-bis(α, α-dimethyl-benzyl)diphenylamine | 2 | — | 2 | 2 | — |
| (c) Nickel dibutyldithiocarbamate | 1 | 2 | 1 | — | 2 |
| Poly(2,2,4-trimethyl-1,2-dihydroquinone | — | — | — | — | — |
| 4,4'-diaminodiphenyl ether | 0.45 | 0.45 | — | — | — |
| Di-o-tolylguanidine | 2.0 | 2.0 | — | — | — |
| 2,4,6-trimercapto-s-triazine | — | — | 0.5 | 0.5 | 0.5 |
| Zinc dibutyldithiocarbamate | — | — | 1.5 | 1.5 | 1.5 |
| Dry physical properties: | | | | | |
| Tensile strength (MPa) | 13.1 | 13.0 | 11.7 | 11.4 | 11.4 |
| Elongation (%) | 220 | 220 | 170 | 170 | 170 |
| Hardness | 69 | 70 | 70 | 71 | 70 |
| Physical properties after imposition of heat load | | | | | |
| Tensile strength (MPa) | 7.1 | 7.8 | 8.6 | 8.6 | 8.4 |
| Elongation (%) | 180 | 150 | 80 | 60 | 40 |
| Hardness | 87 | 89 | 91 | 91 | 94 |
| Variation of physical properties after imposition of heat load | | | | | |
| Tensile strength variation (%) | −46 | −40 | −26 | −25 | −26 |
| Elongation variation (%) | −18 | −32 | −53 | −65 | −76 |
| Hardness variation | +18 | +19 | +21 | +20 | +24 |

In comparative Example 5 wherein acrylic rubber B containing vinyl chloroacetate as crosslinking monomer units was used, variation in tensile strength and hardness by imposition of heat load is small, but variation in elongation by heat load is too large.

In comparative Example 6 wherein acrylic rubber B was used and an acrylic rubber composition not containing nickel dialkyldithiocarbamate (c) was used, variation in elongation by heat load is too large.

In comparative Example 7 wherein acrylic rubber B was used and an acrylic rubber composition not containing aromatic secondary amine (b) was used, variation in elongation by heat load is further large.

In contrast, acrylic rubber composition of the present invention is characterized as exhibiting low variation in physical properties, for example, in elongation and tensile strength by heat load.

INDUSTRIAL APPLICABILITY

The crosslinked rubber article of the present invention is characterized as having excellent heat resistance and exhibiting especially a reduced variation in elongation upon the imposition of heat load. Therefore, the crosslinked rubber article has a wide application as rubber material in fields including transportation facilities such as automobiles, general equipment, and electronic and electric fields. More specifically, the crosslinked rubber article is useful as seals, vibrating insulators, wire coverings, industrial belts, hoses, sheet, rolls, boots, or parts of these members.

What is claimed is:
1. An acrylic rubber composition comprising 100 parts by weight of (a) an acrylic rubber having carboxyl groups, 0.3 to 8 parts by weight of (b) an aromatic secondary amine compound, and 0.3 to 8 parts by weight of (c) nickel dialkyldithiocarbamate.

2. The acrylic rubber composition according to claim 1, wherein the content of carboxyl groups in said acrylic rubber is in the range of $5 \times 10^{-4}$ to $4 \times 10^{-1}$ ephr.

3. The acrylic rubber composition according to claim 1, wherein said acrylic rubber (a) having carboxyl groups is a copolymer made by copolymerization of an acrylic acid ester monomer with an ethylenically unsaturated monomer having a carboxyl group or carboxyl groups.

4. The acrylic rubber composition according to claim 3, wherein said acrylic acid ester monomer is selected from acrylic acid alkyl ester monomers, the alkyl group of which has 1 to 8 carbon atoms, and combinations of acrylic acid alkyl ester monomers, the alkyl group of which has 1 to 8 carbon atoms, with acrylic acid alkoxyalkyl ester monomers, the alkoxyalkyl group of which has 2 to 16 carbon atoms.

5. The acrylic rubber composition according to claim 3, wherein said ethylenically unsaturated monomer having a carboxyl group or carboxyl groups is selected from acrylic acid, methacrylic acid, ethacrylic acid, itaconic acid, maleic acid, fumaric acid, citraconic acid, monomethyl maleate, monoethyl maleate, mono-n-butyl maleate, monomethyl fumarate, monoethyl fumarate, mono-n-butyl fumarate, maleic anhydride and citraconic anhydride.

6. The acrylic rubber composition according to claim 3, wherein the total amount of units of the acrylic acid ester monomer and units of the ethylenically unsaturated monomer having a carboxyl group or carboxyl groups in said acrylic rubber having carboxyl groups is at least 70% by weight based on the weight of the copolymer.

7. The acrylic rubber composition according to claim 6, wherein the amount of the acrylic acid ester monomer units is in the range of 90 to 99.5% by weight based on the total amount of the acrylic acid ester monomer units and the units of the ethylenically unsaturated monomer having a carboxyl group or carboxyl groups.

8. The acrylic rubber composition according to claim 1, wherein said aromatic secondary amine compound (b) has a structure such that two groups each having an aromatic ring are bonded to a nitrogen atom or nitrogen atoms.

9. The acrylic rubber composition according to claim 8, wherein said aromatic secondary amine compound (b) is selected from phenyl-α-naphthylamine, 4,4'-dioctyldiphenylamine, 4,4'-bis(α,α-dimethylbenzyl) diphenylamine, 4-(α-phenylethyl)diphenylamine, 4,4'-bis(α-phenylethyl)diphenylamine, N,N'-diphenyl-p-phenylenediamine, N-isopropyl-N'-phenyl-p-phenylenediamine and N-phenyl-N'-(3-methacryloyloxy-2-hydroxypropyl)-p-phenylenediamine.

10. The acrylic rubber composition according to claim 1, wherein the nickel dialkyldithiocarbamate (c) has two alkyl groups each having 1 to 8 carbon atoms.

11. The acrylic rubber composition according to claim 10, wherein the nickel dialkyldithiocarbamate (c) is selected from nickel dimethyldithiocarbamate, nickel diethyldithiocarbamate and nickel dibutyldithiocarbamate.

12. A crosslinkable acrylic rubber composition comprising 100 parts by weight of (a) an acrylic rubber having carboxyl groups, 0.3 to 8 parts by weight of (b) an aromatic secondary amine compound, 0.3 to 8 parts by weight of (c) nickel dialkyldithiocarbamate, and 0.1 to 10 parts by weight of a crosslinking agent.

13. The crosslinkable acrylic rubber composition according to claim 12, wherein the crosslinking agent is a polyamine compound.

14. The crosslinkable acrylic rubber composition according to claim 13, wherein the crosslinking agent is selected from hexamethylenediamine, hexamethylenediamine carbamate, N,N'-dicinnamylidene-1,6-hexanediamine, 4,4'-methylenedianiline, m-phenylenediamine, 4,4'-diaminodiphenyl ether, 3,4'-diaminodiphenyl ether, 4,4'-(m-phenylenediisopropylidene)dianiline, 4,4'-(p-phenylenediisopropylidene)dianiline, 2,2'-bis[4-(4-aminophenoxy)phenyl]propane, 4,4'-diaminobenzanilide and 4,4'-bis(4-amoinophenoxy)biphenyl.

15. The crosslinkable acrylic rubber composition according to claim 12, which further comprises 0.1 to 20 parts by weight of a crosslinking accelerator, based on 100 parts by weight of the acrylic rubber having carboxyl groups.

16. The crosslinkable acrylic rubber composition according to claim 13, which further comprises 0.1 to 20 parts by weight, based on 100 parts by weight of the acrylic rubber having carboxyl groups, of a crosslinking accelerator selected from guanidine accelerators, quaternary onium salt accelerators, tertiary amine accelerators, tertiary phosphine accelerators, alkali metal salts of a weak acid, alkali metal alkoxylates and alkali metal phenolates.

17. A crosslinked article made by crosslinking the crosslinkable acrylic rubber composition according to claim 12.

18. The crosslinked article according to claim 17, which is a seal, a hose, a vibrating insulator, or boots, or a part thereof.

* * * * *

UNITED STATES PATENT AND TRADEMARK OFFICE
CERTIFICATE OF CORRECTION

PATENT NO.    : 6,689,843 B2
DATED         : February 10, 2004
INVENTOR(S)   : Kubota et al.

It is certified that error appears in the above-identified patent and that said Letters Patent is hereby corrected as shown below:

<u>Title page,</u>
Item [87], change item, "[87] PCT pub. Date: Sep 8, 2001" to -- [87] PCT pub. Date: Aug. 9, 2001 --

Signed and Sealed this

Twenty-second Day of June, 2004

JON W. DUDAS
*Acting Director of the United States Patent and Trademark Office*